United States Patent [19]

Mattson

[11] Patent Number: 4,575,918
[45] Date of Patent: Mar. 18, 1986

[54] TOOL CHANGE MECHANISM

[75] Inventor: Clyde E. Mattson, Waukesha, Wis.

[73] Assignee: Kearney & Trecker Corporation, West Allis, Wis.

[21] Appl. No.: 626,225

[22] Filed: Jun. 29, 1984

[51] Int. Cl.[4] ............................................. B23Q 3/157
[52] U.S. Cl. .................................... 29/568; 29/426.3; 414/732
[58] Field of Search ............... 29/568, 426.3; 414/732, 414/739

[56] References Cited

U.S. PATENT DOCUMENTS

| | | | |
|---|---|---|---|
| 3,492,717 | 2/1970 | Seidel et al. | 29/568 |
| 3,587,873 | 6/1971 | Lohneis | 29/568 |
| 3,608,185 | 9/1971 | Pfister | 29/568 |
| 3,608,188 | 9/1971 | Seidel | 29/568 |
| 3,760,491 | 9/1973 | Zankl et al. | 29/568 |
| 4,087,901 | 5/1978 | Lohneis et al. | 29/568 |
| 4,164,290 | 8/1979 | Zankl | 414/739 |
| 4,288,909 | 9/1981 | Kielma et al. | 29/568 |
| 4,403,391 | 9/1983 | Peacock | 29/568 |

Primary Examiner—James M. Meister
Attorney, Agent, or Firm—Quarles & Brady

[57] ABSTRACT

A tool changer for interchanging tools between a machine tool and a magazine in a minimum amount of time so as to reduce the down time of a machine tool. The tool changer includes a frame or base member for mounting on the machine tool with the frame member presenting at least two spaced apart mounting planes. Two tool change arm members are rotatably mounted on the frame and in the spaced apart mounting planes. A drive mechanism affords a reciprocating rotatable motion as well as a linear motion of each arm member so as to effect a motion similar to a fourbar linkage and a parabolic motion to the arm members. Each arm member has a clamping portion to grip tools in a firm but releasable manner. In a preferred manner, the arms are rotated through an arc of 180° and the clamping members are positioned 90° out of phase from each other. Also preferably the mounting planes are positioned at an angle of 45° with respect to each other with the base portion providing the mounting planes in the form of a truncated triangle.

20 Claims, 23 Drawing Figures

TOOL CHANGE MECHANISM

BACKGROUND OF THE INVENTION

The present invention relates to the tool change mechanism art in which a plurality of tools for use at a work station of a machine tool are stored in a tool storage magazine. In mechanisms of this type, a tool transfer member is commonly provided for extracting a selected tool from the magazine and transferring it to the work station and for likewise removing the previously used tool from the work station and returning it to the magazine.

Tool change mechanisms of this type are well known as exemplified by a tool interchanger 31 illustrated by two hinged arms 33 and 34 as well as a slidable drive rod 44 in U.S. Pat. No. 3,492,717. A tool changer with hinged arms 36 and 37 is also illustrated in U.S. Pat. No. 3,608,188. Tool changing arms without hinging are shown at 28 and 29 in U.S. Pat. No. 3,608,185 and at 45 in U.S. Pat. No. 3,760,491 where a scissors type tool changer is illustrated as well as in U.S. Pat. No. 4,087,901. In U.S. Pat. Nos. 3,587,873, 4,288,909 and 4,164,290, tool change arms are indicated at 32, 298 and 46, respectively, wherein the arm members are of a one piece construction. While the foregoing tool changing arms offer a variety of tool change operations and many of them are efficient in their operation, there still exists a need for a tool change arm which can reduce the amount of time required to remove a used tool from a spindle in a work station and replace it with a new tool. Although the time required to change a tool averages about six seconds, a machining operation is not taking place. If this time could be reduced it could reduce the time that the machine is not machining. For example, when the machine is not working during a normal machine tool change, the following steps are taking place: the changer is rotated to the spindle tool change position; the changer then clamps onto the tool in the spindle; the tool is pulled out of the spindle; the old tool is rotated away and a new tool is rotated into the spindle area; the new tool is pushed into the spindle; the tool is unclamped in the spindle from the changer; and the changer is rotated to the tool storage change position.

It is a general advantage of the present invention to provide an improved tool change mechanism which will substantially reduce the amount of time a tool machine is not working in order to effect the changing of tools. A further advantage is to provide a tool change mechanism that is simple in its construction and is readily adaptable to existing tool machines and tool magazines. It is a further advantage to provide a tool change mechanism which is durable in its construction yet can afford a multiplicity of positions for the tools being interchanged between the magazine and the spindle head.

SUMMARY OF THE INVENTION

The foregoing advantages are accomplished and the shortcomings of the prior art are overcome by the present tool changer which includes a frame member for mounting on a machine tool with the frame member presenting at least two spaced apart mounting planes. A first and a second tool change arm member is rotatably and pivotally mounted on the frame member and in the spaced apart mounting planes. Means are provided in conjunction with the frame member and each arm member to effect both a reciprocating and rotatable motion as well as a linear motion of each arm member. Gripping means are provided on the outer end of each arm member for receiving a tool and for clamping the tool thereto.

The movement of the two arms is arranged so that as one arm is extracting a previously used tool from the spindle the other arm is at the same time moving a new tool toward the spindle. Thus, the two arms move in unison with both arms performing their individual functions so that as the old tool clears the spindle but before it is fully retracted, the new tool is entering the spindle. As a result the interchange of tools in the spindle occurs at a speed that is not possible with the prior art structures.

The reciprocating rotatable motion as well as the linear motion effected in conjunction with the two arm members is responsible for the fast interchange of a new tool with a previously used tool during the time when the machine is stopped. This multiple motion is afforded by a gear member with each arm member pivotally secured therethrough and a drive gear positioned for engagement with the gear members. The drive gear is mounted on a drive shaft and a pinion gear is mounted oppositely on the shaft with a rack mounted on the frame or body member for engagement with the pinion gear. A bar member is attached to a shaft extending from each arm member and a pin extends from the bar and is received in a slot in the frame. This arrangement is in effect a four bar linkage motion which permits the arm members to move in the foregoing manner. Preferably, the rotation of the arm members is effected over 180° and the clamping members will be open ended with the open ends being positioned approximately 90° out of phase with each other at all times. Not only does the tool changer of this invention effect the four bar linkage movement but will also effect a parabolic motion to the arm members with respect to the tool doing its interchange between the magazine and the spindle head. Preferably, the mounting planes of the tool changer will be provided by opposing face portions which are disposed at approximately an angle of 45° in the frame member which will have a shape substantially in the form of a truncated triangle.

The tool changer with the foregoing features is readily placed on the frame of a machine tool which will have the usual cutter-carrying spindle supported by the frame. A tool storage magazine will carry a plurality of tools to be used in the spindle for work operations. The tool changer will be rotatably mounted on the machine tool frame for purposes as previously described.

The foregoing and other advantages of this invention, which will become more fully apparent from the following detailed description, may be achieved by the means of the exemplifying apparatus depicted in and set forth in this specification in connection with the accompanying drawings.

DESCRIPTION OF THE PREFERRED EMBODIMENT GENERAL ARRANGEMENT

Figure 1:
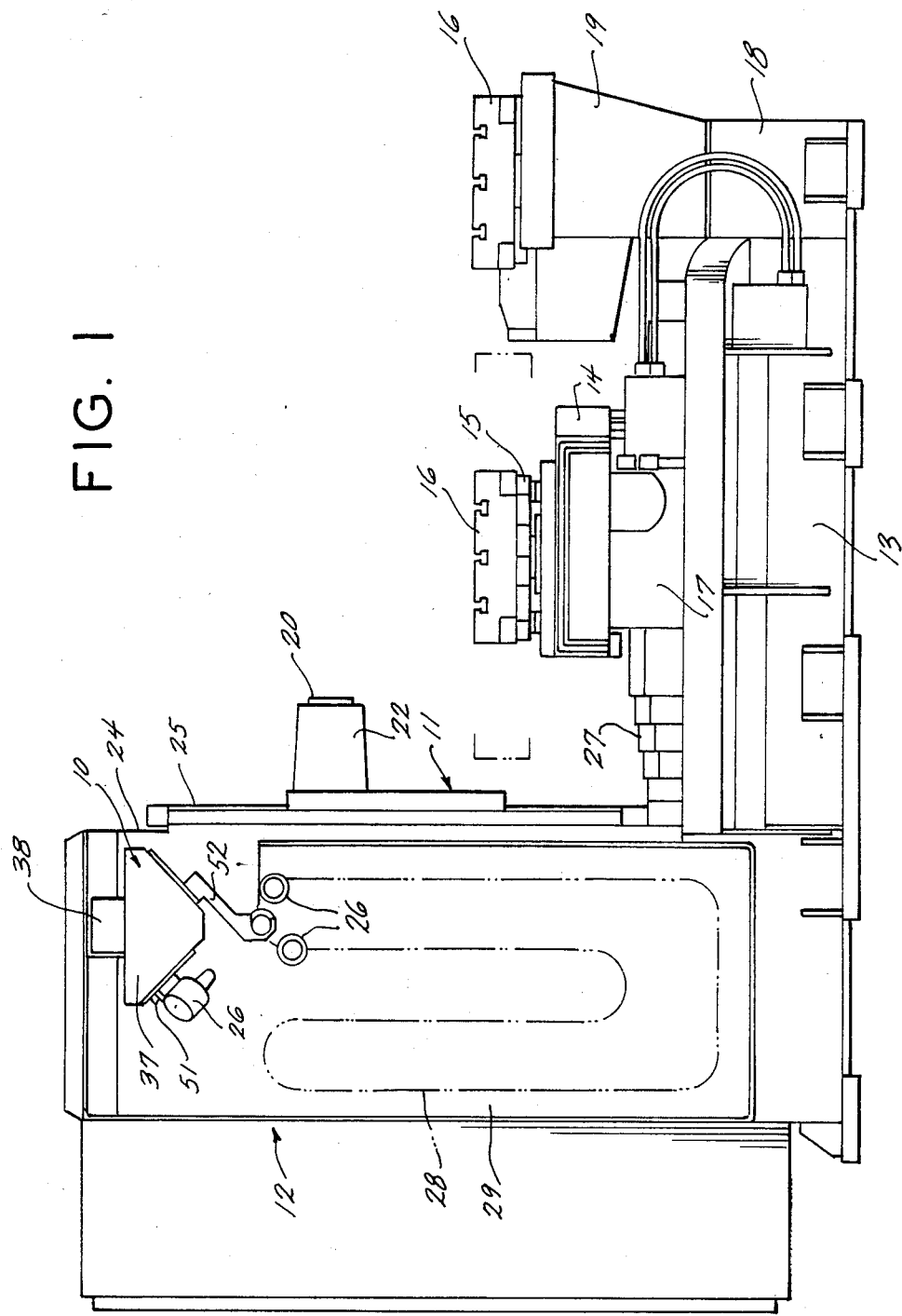
FIG. 1 is a view in side elevation illustrating a machine tool incorporating the improved tool change mechanism of the present invention.
Figure 2:
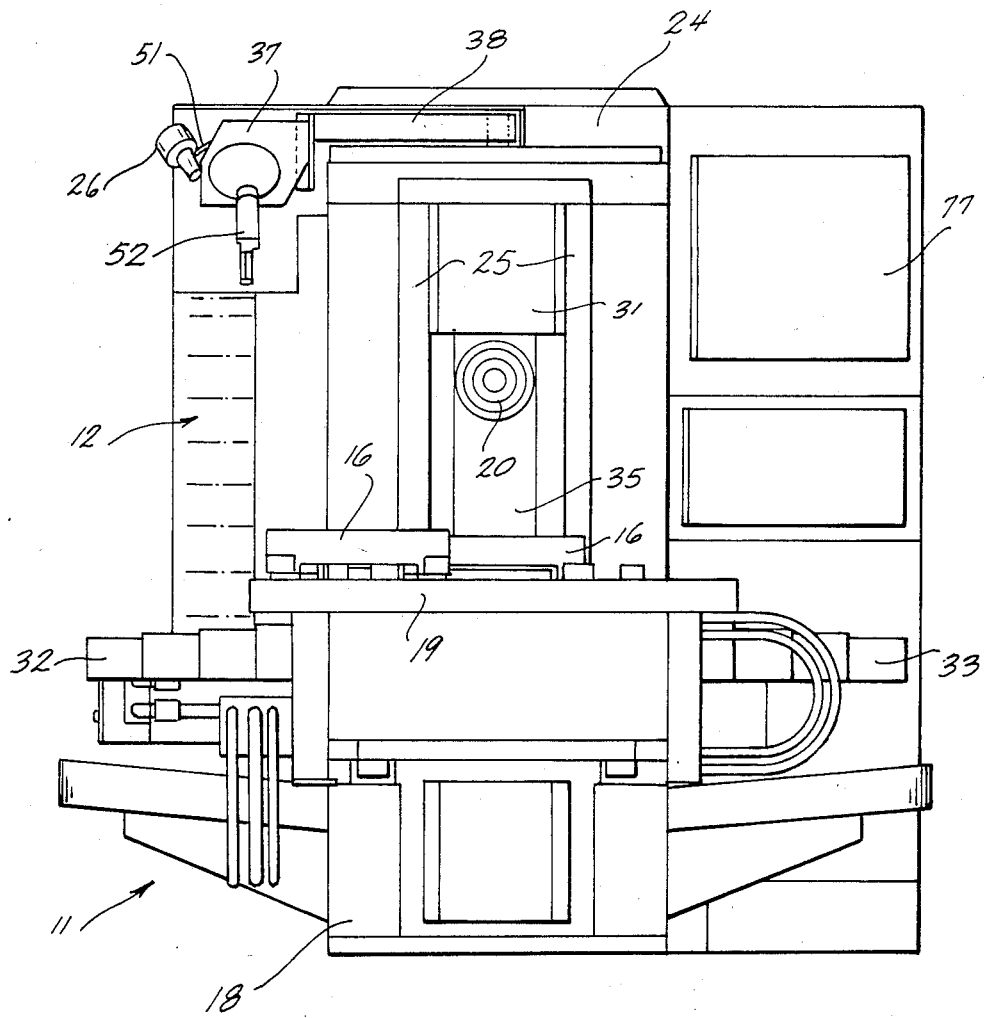
FIG. 2 is a front elevational view of the machine tool shown in FIG. 1.
Figure 3:
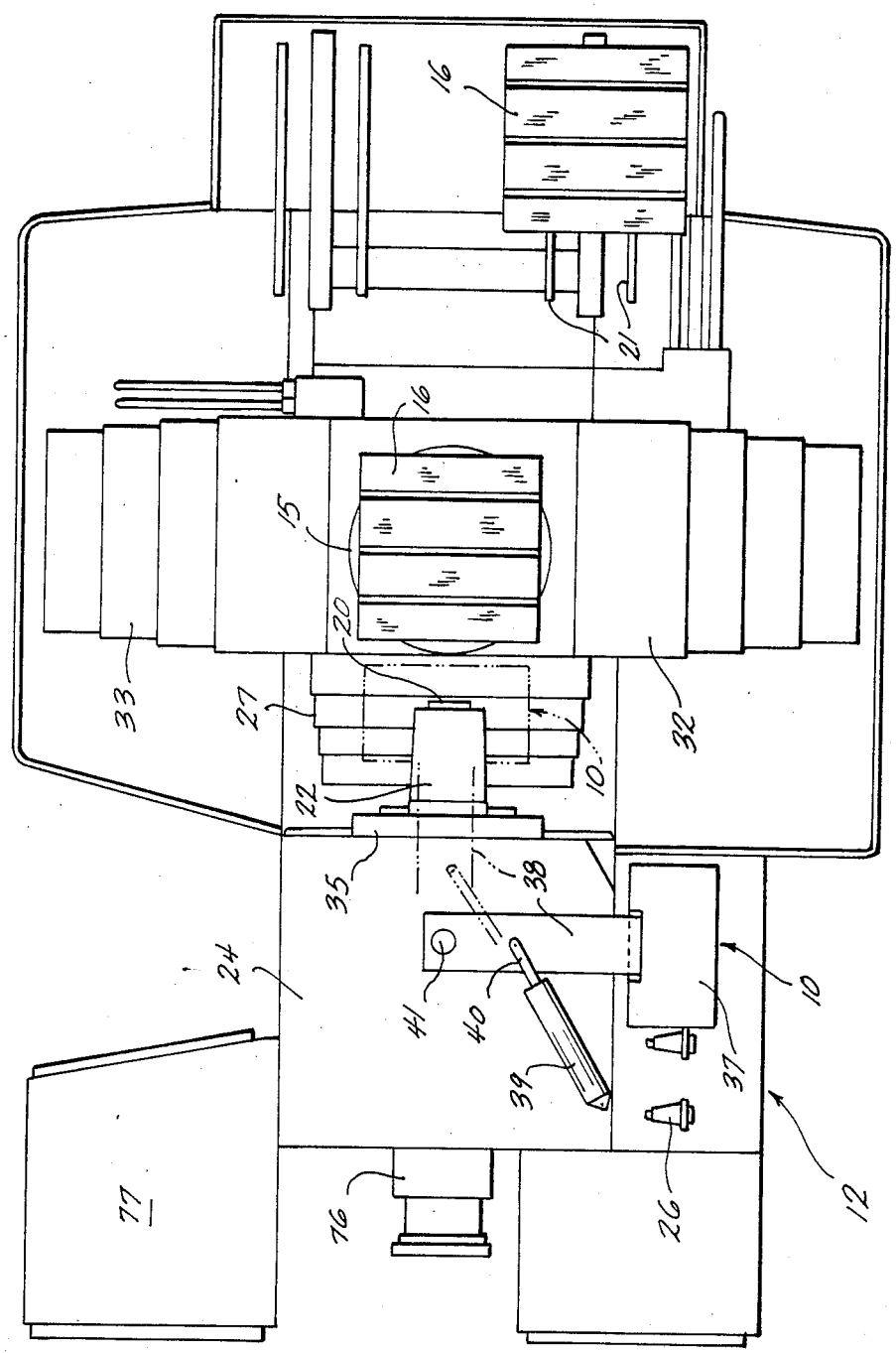
FIG. 3 is a top plan view of the machine tool depicted in FIG. 1.

Reference is now made more particularly to the drawings and specifically to FIGS. 1, 2 and 3 thereof which illustrate a machining center generally 11 incorporating the improved tool change mechanism generally 10 of the present invention. As there shown, the machine comprises a bed 13 which carries a work supporting table 14 and an upright 24 at its rearward position. The upright 24 operably carries a spindle head 22 in which is supported a spindle 20 which is adapted to receive a cutting tool for performing a work operation. It should be understood that the cutting tools used in the illustrated machine are mounted in a standard tool holder which is adapted for reception in the spindle 20. In this description, the combination of the tool holder and its associated cutter will be referred to generally as a tool and will be identified by the referenced numerals 26, 23 or 30.

The table 14 is carried by the saddle 17 for movement in a horizontal path of travel to the axis of the spindle 20. This path of travel to the table 14 is commonly referred to in the art as the X-axis of movement. To this end, the table 14 is carried on a pair of ways (not shown) that are mounted on the top surface of saddle 17 for sliding engagement with the bottom of the table 14.

The saddle 17 is carried by the bed 13 for movement in a horizontal path of travel to the axis of the spindle 20. This path of travel to the saddle 17 is commonly referred to in the art as the Z-axis of movement. To this end the saddle 17 is carried on a pair of ways (not shown) which are disposed under way cover 27 and are mounted on the top surface of the bed 13 for sliding engagement with the bottom of the saddle 17.

A rotary table 15 is supported by the table 14 and is adapted to receive a pallet 16 on which the workpiece (not shown) to be operated on is mounted. The machine includes a shuttle mechanism generally identified by the numeral 19 and is supported on extension 18. The shuttle will receive a pallet 16 containing the finished workpiece and presents a new pallet 16 containing a new workpiece for mounting on the rotary table 15. Shuttle arrangements for changing the workpieces on the rotary table 15 are well known in the art and will not be explained here in detail.

The spindle head 22 is movable in a vertical path of travel normal to the path of travel of the table 14 along a path generally referred to as the Y-axis of movement. To this end, the upright 24 is provided with an opening 31 defined in part by a pair of vertical ways 25 which are slidably engaged by cooperating ways (not shown) on the column 35 carrying the spindle head 22.

Suitable drive mechanisms are provided for actuating the table 14, spindle head 22 and saddle 17 in their respective paths of travel along the X, Y and Z axes. In addition, a power drive means is provided for the rotary table 15 with the pallet 16 mounted thereon to present a workpiece to the tool. All of these movements are preferably under the control of a numerical control circuit, which will be contained in a control center 77. Further, a suitable and commonly employed drive mechanism such as shown at 76 is provided to rotate spindle 20 as well as to open and close a collet carried by spindle 20 for purposes of changing tools.

TOOL CHANGER

The tool changer generally 10 is typically attached to upright 24 as will be best seen in FIGS. 2 and 3. This pivotal attachment is afforded by the pivotal arm 38 attached to the upright 24 by means of a pivot 41. A piston and cylinder mechanism 39 with the usual piston arm 40 provides the 90° pivotal motion. Referring to FIG. 1, the tool change mechanism is pivotally located to travel over the magazine 12 which will include a support 29 with a tool carrying sprocket chain 28. The sprocket chain 28 is commonly used in tool magazines for machining centers and consequently the details thereof are not described. Suffice it to say that it will include a multiplicity of different tools such as indicated by the numeral 26 for movement in selected positions by being carried in sprocket chain 28 along a generally U-shaped path of travel. As seen in FIG. 1, tool change mechanism 10 has a rotatable arm 52 extending from a body or frame member 37 of the tool change mechanism for positioning in the path of sprocket chain 28 for reception of a tool 26.

Figure 4:
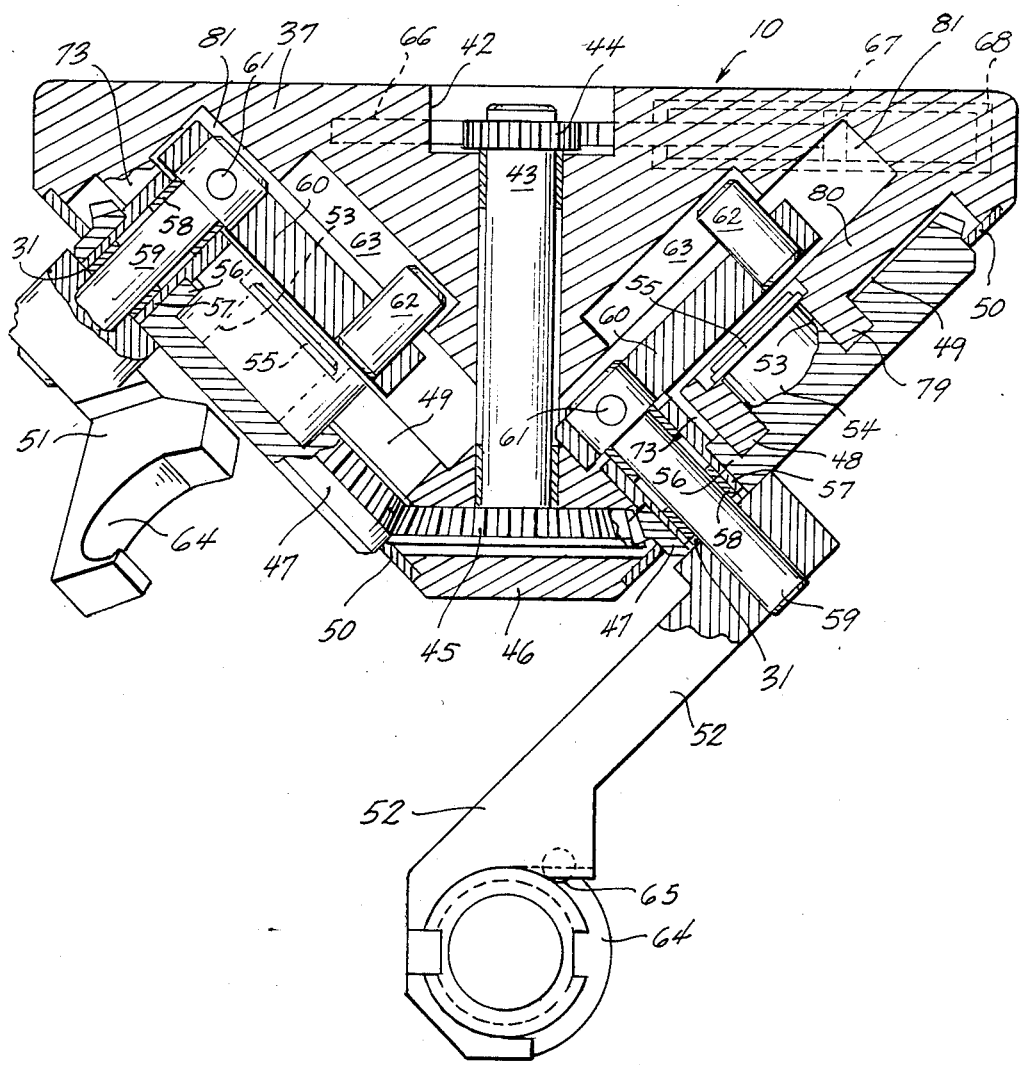
FIG. 4 is a view in partial vertical section illustrating the drive mechanism for the tool changer of this invention.
Figure 5:
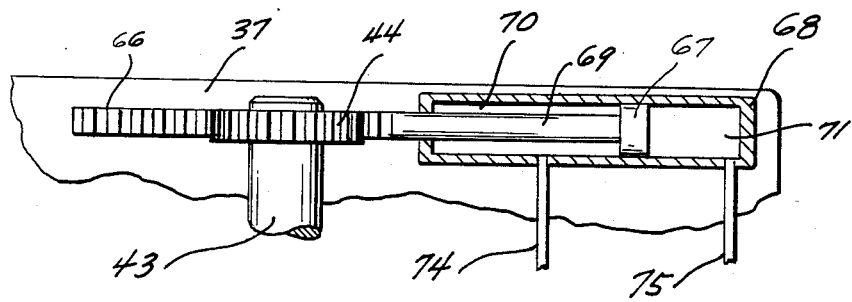
FIG. 5 is a partial view of the tool changer illustrated in FIG. 4 illustrating a portion of the drive mechanism therefor.

Referring specifically to FIGS. 4 and 5, the details of tool changer 10 are illustrated. A base member 37 has a central chamber 42 which will receive a pinion gear 44 secured on a shaft 43 centrally positioned therethrough. A drive bevel gear 45 is secured at the opposite end of the shaft 43 and retained thereon by a retaining cap 46. The arm members 51 and 52 are rotatably mounted on the body member 37 and are pivotally secured through the gears 47 which engage the drive bevel gear 45. As the mounting and drive mechanisms for each arm are the same, only that drive mechanism with respect to the arm 52 will be specifically described with the same numbers being utilized for the same parts with respect to both arm drive mechanisms. The gear 47 is positioned in a compartment 49 and retained therein in a rotatable manner through a hub member 79 with an annular cavity 53 for receiving a shaft portion 54. The hub member 79 is supported in compartment 49 by an arm 80. A retainer 55 in the form of a snap ring provides the suitable rotatable retention of the gear 47 with a flange portion 56 spaced outwardly from the annular wall portion 48 defining cavity 53. An opening 31 is disposed through the gear 47 to receive a shaft 59 in an extending portion 57 as well as a bushing 58 providing for rotation of the shaft 59 therein. Secured to the end of the shaft 59 opposite the arm 52 is a bar 60 with a pin 61 affording the attachment. Bar 60 will rotate below arm 80 in the compartment portion 81. Extending from the bar 60 is a pin 62 positioned to ride in an arcuate slot 63 provided in the body or base casting 37. A cover plate 50 is positioned in the body member 37 for covering that portion of the compartment 49 not occupied by the gear 47 and will be secured thereto such as with screws threadably received in the body member 37. The arm members 51 and 52 each have a grip 64 with a roller type detent 65 for securing a tool 26 therein.

Figures 4A, 6:
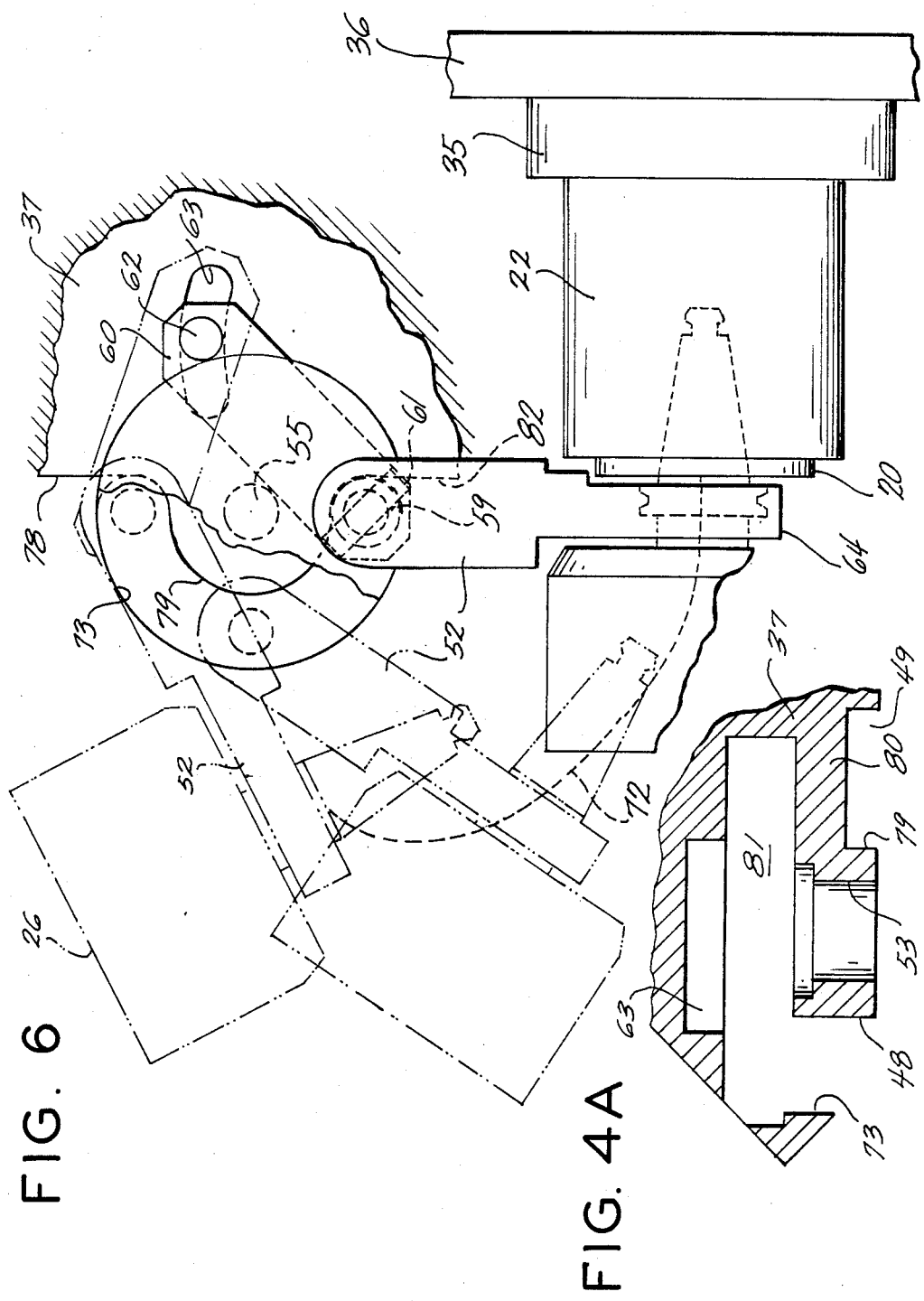
FIG. 4A is a partial view in vertical section showing the various compartments and slots in the body member of the tool changer for accommodating the components of the drive mechanism therein.
FIG. 6 is a top plan view illustrating the parabolic motion of one of the arm members in carrying a tool to the tool machine.

As best seen in FIG. 4A, the extension of the arm 80 into the open area of the base casting forms an arcuate opening 73 which will accommodate the shaft 59 as well as the extending portion 57 of the gear 47. This opening will afford a 180° path of travel for the shaft 59 around the hub member 79 as will be later explained in conjunction with FIG. 6.

Referring specifically to FIG. 5, the drive means for rotating pinion gear 44 is illustrated. It includes a rack 66 for engagement with the pinion gear 44 with the rack being connected to a piston rod 69 of a piston 67 in piston and cylinder mechanism 68 for actuating the rack 66 in a rectilinear path of travel. Hydraulic pressure lines 74 and 75 are in communication with the piston and cylinder mechanism 68 for energizing it.

OPERATION

A better understanding of the advantages of the tool changer 10 will be had by a description of its operation in conjunction with the machine tool 11. This is best illustrated in FIG. 6 as well as FIGS. 7, 7A–14, 14A. The movement of the arm 52 is depicted in FIG. 6 wherein it will be noted that a parabolic motion is effected for the arm 52 and consequently a tool 26. This same motion will be effected for arm 51 and is illustrated through broken line 72 indicating the path of travel of arm 52. This parabolic motion is achieved in the combined rotation of the arm 52 about the axis of the pin 59 while the pin 59 is moving bodily in an arcuate path about the axis of the gear 47 by the rotation of the gear 47 since the pin 59 passes through the opening 31 in the gear 47. It will be further appreciated in conjunction with FIG. 6 that an arcuate passage 73 is in effect provided in the body member 37 which limits the travel of shaft 59 through an arcuate path of travel of 180 degrees around the hub 79. The extent of travel is defined by the wall surface 78 and 82 of body member 37. At the same time, the pin 62 which is secured to the bar 60 will ride in the slot 63 to further direct the movement of arm 52 in a linear manner which is necessary to move tool 26 in and out of spindle head 22 in that portion of travel immediately in front of the spindle head. It is this combination of arcuate and linear travel which affords the parabolic motion to the arm 52 as well as the arm 51. In effect, a fourbar linkage motion is effected through the use of the arcuate rotation as well as linear movement of the arm 52.

Figure 7:
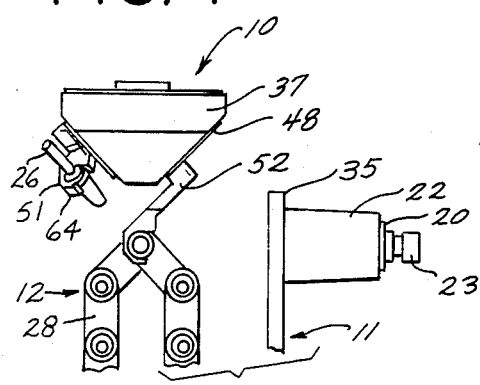
FIGS. 7–14 and 7A–14A are diagrammatic views illustrating various motion steps in removing and placing a tool from a machine tool to a magazine utilizing the tool changer of this invention with the Figures designated with the "A" being front views of the corresponding numbered Figures.
Figure 7A:
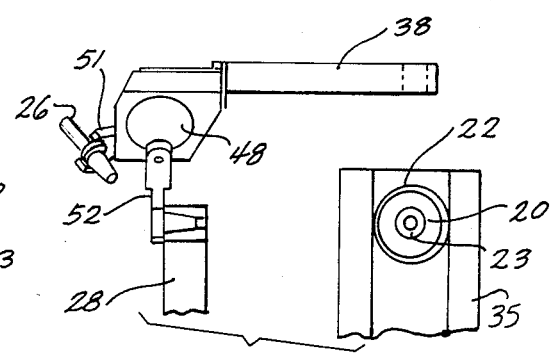
Figure 8:
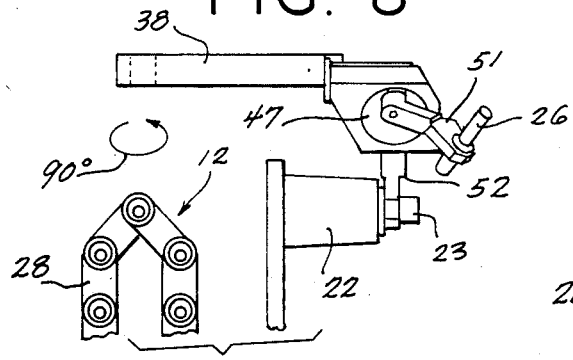
Figure 8A:
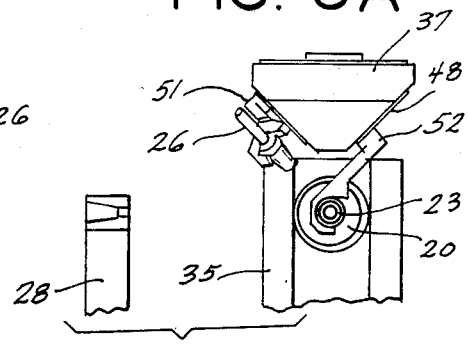
Figure 9:
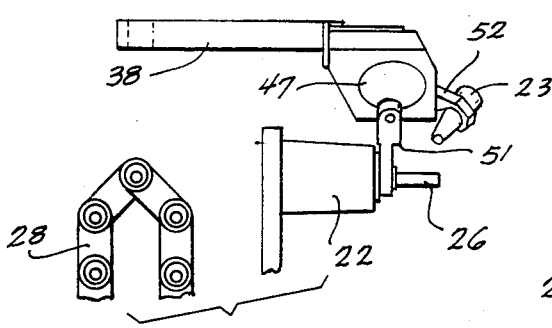
Figure 9A:
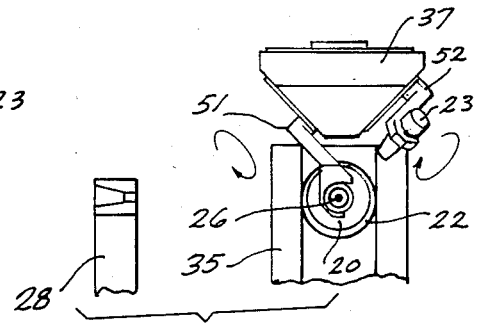
Figure 10:
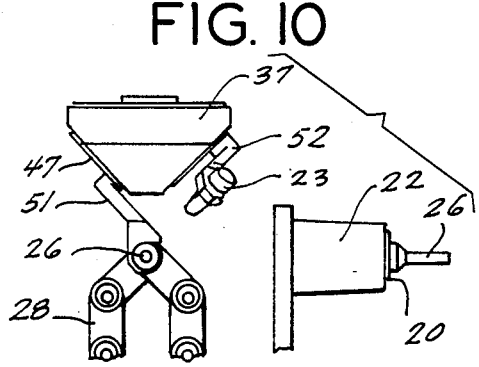
Figure 10A:
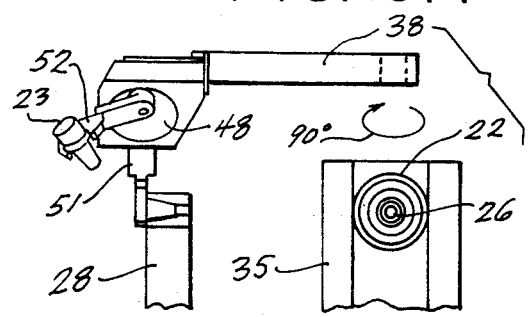

FIGS. 7, 7A–14, 14A depict the cycle of interchange for replacing an old tool in the spindle head 22 with a new tool 26 from the magazine sprocket chain 28. As indicated earlier, FIGS. 7–14 are views which are from the left side of the machine tool 11 with the Figures utilizing the "A" designations being corresponding front views. FIGS. 7 and 7A illustrate the tool changer 10 in the ready position and positioned out of the work area with grip of the left arm 51 holding a new tool 26 in the up position. The grip of the right arm 52 is empty and stationed in front of the magazine 28. This is the start of the tool change cycle; machining has stopped and the tools are ready for changing. In FIG. 8, the tool changer 10 has now been pivoted 90 degrees by means of the pivotal arm 38 moving into position for changing tools in the spindle 20 with the grip of the right arm 52 having been moved into engagement with the old tool 23 in the spindle during this rotation. In the customary manner, a collet in the spindle 20 will unclamp the tool 23. Simultaneously, the right arm 52 of the tool changer 10 with the tool 23 moves out of the spindle 20 and rotates upwardly while at the same time the left arm 51 with the next tool 26 in its grip rotates downwardly to move the tool into the spindle 20. This is illustrated in FIGS. 9 and 9A. The collet then clamps the new tool 26 into the spindle 20. As shown in FIGS. 10 and 10A, the tool changer 10 is pivoted 90 degrees back to its original position and into the tool storage area adjacent the magazine sprocket chain 28 and the new tool 26 remains in the spindle 20. It should be pointed out that the previous steps all occur while the machine is not working. Although the tool change cycle is not complete the machine may start machining at this stage.

Figure 11:
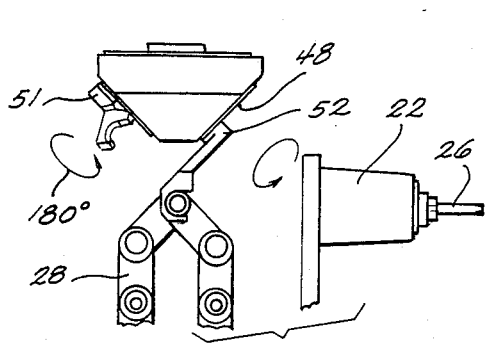
Figure 11A:
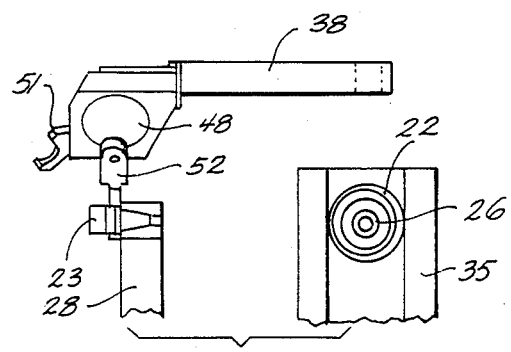
Figure 12:
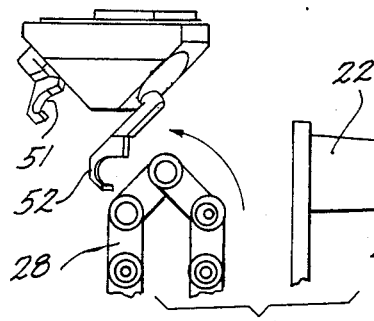
Figure 12A:
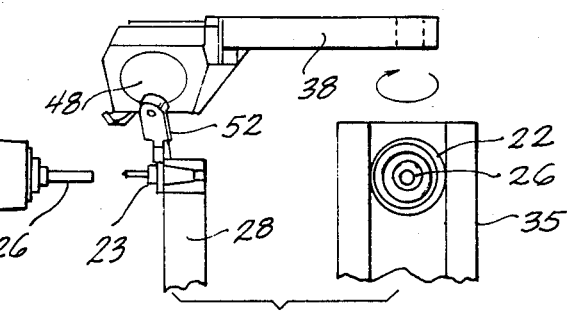
Figure 13:
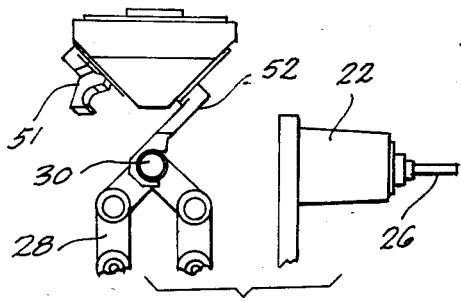
Figure 13A:
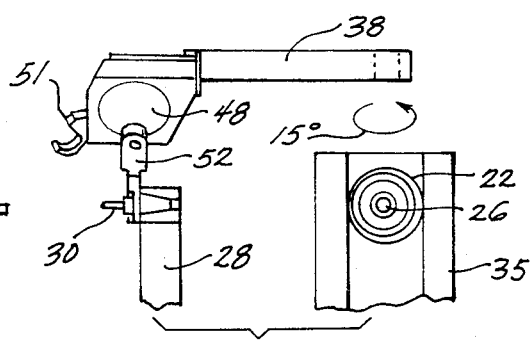
Figure 14:
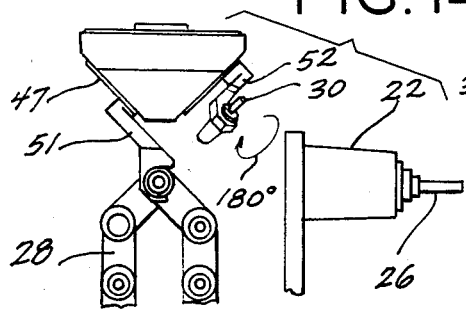
Figure 14A:
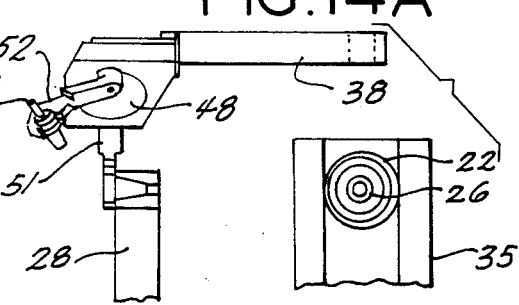

The next step in the tool exchange is illustrated in FIGS. 11 and 11A where the left arm 51 which is now empty rotates upwardly while the right arm 52 with the old tool 23 in its grip rotates downwardly to move the tool into the empty socket at the tool ready station in the tool storage sprocket chain magazine to deposit the tool therein. FIGS. 12 and 12A show a tool search function in that the tool changer 10 is moved away from the tool storage magazine while leaving the old tool 23 in the tool storage sprocket chain 28. The sprocket chain 28 is rotated until the next to be used tool 30 is in the ready position. This is best illustrated in conjunction with FIGS. 13 and 13A. In this step, the tool changer 10 is back so that the grip of the right arm 52 engages the tool in the tool ready station of the magazine. The final steps in the tool interchange are indicated in FIGS. 14 and 14A where simultaneously the right arm 52 of the tool changer with the tool 30 moves out of the tool storage area and rotates upwardly while the left arm 51 of the tool changer 10 with its grip empty rotates downwardly. It will be seen that the cycle is now complete and the position of the tool change arms 51 and 52 for the next cycle are in a reversed sequence. It should be pointed out that the time required to perform those steps in the tool interchange is a very minimum.

It will be further appreciated that during the previous 90° rotation of arm 38 to move it from the tool storage area as represented by magazine 28 to the front of the spindle head 22 will be effected through the activation of the cylinder 39 as best seen in FIG. 3. Further, the rotation of the arms 51 and 52 will be effected through the supply of pressurized fluid in the cylinder 68 which in turn will cause the rack 66 to move back and forth and rotate the pinion gear 44 as seen in FIG. 5. The pinion gear 44 in turn will rotate the shaft 43 and drive the bevel gear 45 to rotate the arm gears 47.

From the foregoing detailed description of the illustrative embodiment set forth herein to exemplify the present invention, it will be apparent that there has been provided an improved tool changer which operates with the utmost efficiency for transferring a tool and is especially designed to effect the transfer in the minimum amount of time. Not only is the total amount of time reduced for tool exchange but more importantly, the time that the machining center is not machining is reduced. The tool changer of this invention is adaptable to any machining center having a rotating spindle and a magazine storage area wherein the tools can be removed with a gripping type arm. The tool changer is durable in its construction thus requiring a low maintenance yet affording high performance.

Although the illustrative embodiment of the invention has been described in detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the sub-joined claims.

I claim:

1. In a tool changing mechanism for exchanging the cutting tools in the work station of a machine tool; a frame supporting said work station; a tool ready storage magazine mounted on said frame and carrying a plurality of tools for use in the work station; a tool ready station in said magazine for receiving a selected tool to be transferred to the work station and for receiving the previously used tool transferred from the work station for storage; a tool change mechanism boby; means supporting said body for movement relative to said frame between said tool ready station and said work station; the improvement comprising a pair of tool change arms supported by said body for both pivotal and bodily movement; a grip mounted on each of said arms for securing the tools to be transferred; means disposed in said body for pivoting both of said arms simultaneously about their separate pivot points while at the same time moving the pivot points of both of said arms in a predetermined path of travel for moving one of said grips in a single continuous arcuate path of travel that extracts a previously used tool from the work station and then shifts it away from the work station while at the same time moving the second grip that is carrying a new tool in a second single continuous arcuate path of travel that moves the new tool toward the work station and then loads it into the work station.

2. A tool change mechanism according to claim 1 wherein said body is mounted on an arm; and including means pivotally supporting said arm on said frame for moving said body between the tool ready station and the work station.

3. A tool changer for mounting on a machine tool:
a body member for mounting on said machine tool, said body member presenting two spaced apart mounting planes;
a first tool change arm rotatably supported in said body with its axis of rotation extending through the first of said mounting planes; a second tool change arm rotatably supported in said body with its axis of rotation extending through the second of said mounting planes so that said axes are disposed at angles to each other; a tool grip mounted on each of said arms at the end opposite its axis of rotation for gripping the tool that is being transferred;
means operatively mounted on said body member to effect a rotary motion of each of said arm members about its axis while at the same time imparting a translational motion to the axis of each of said arm members; for moving one of said grips in a single continuous arcuate path of travel to extract a previously used tool from the work station and then move it away from the work station while at the same time moving the second grip that is carrying a new tool in a second continuous arcuate path of travel for moving the new tool toward the work station and then inserting it into the work station.

4. The tool changer according to claim 3 wherein said means to effect said rotary motion as well as said translational motion of each of said arm members is produced by a gear member operatively associated with each of said arm members and a drive gear positioned for engagement with said gear member.

5. The tool changer according to claim 4 further including:
a shaft mounting said drive gear;
a pinion gear mounted on said shaft; and
a rack mounted on said frame member for engagement with said pinion gear.

6. The tool changer according to claim 4 wherein each of said arm members is pivotally attached to said gear member by means of a shaft and further includes:
a bar member attached to each said shaft;
a pin member extending from said bar member; and
a slot in said body member constructed and arranged to receive said pin in a slidable manner so that a four bar linkage motion is transmitted to each of said arm members.

7. The tool changer according to claim 6 wherein said gear member, said pin member and said slot are arranged to effect a parabolic motion to said arm members.

8. The tool changer according to claim 7 wherein said mounting planes are positioned at an angle of approximately 45° with respect to each other.

9. The tool changer according to claim 8 wherein said body member includes a base portion having a shape substantially in the form of a truncated cone.

10. A tool change mechanism according to claim 3 including a pair of gears rotatably mounted on said body member with their axis of rotation disposed at an angle to each other; a bearing formed in each of said gears, each of said bearing having its axis parallel to but offset radially from the axis of rotation of its associated gear; a shaft journaled in each of said bearings and having an end extending outwardly of said gear, one of said tool change arms being secured to the extending end of each of said shafts to extend radially therefrom; and means connected to each of said shafts to cause a rotary movement of each of said shafts about its axis while the shaft is moving bodily in an arcuate path with the rotation of said gear so that each of said tool change arms is moved bodily with its associated shaft while at the same time it is rotating about the axis of its associated shaft to perform the tool transfer operation.

11. In a machine tool:
a frame;
a tool carrying spindle supported by said frame;
a tool storage magazine carrying a plurality of tools to be used in said spindle for work operations;
a tool changer movably carried by said frame; said tool changer including:
a frame member presenting at least two spaced apart mounting planes;
a first and a second tool change arm member rotatably mounted on said frame member and in said spaced apart mounting planes;
gripping means on the outer end of each of said arm members for receiving a tool and for clamping said tool thereto; and
means operatively associated with said frame member and each of said arm members to effect a rotary motion and at the same time a translational motion of the axes of rotation of each of said arm members to move both of said grips in a single continuous path of travel to extract a tool from said spindle and replace it with a new tool.

12. A machine tool according to claim 11 wherein said means to effect said reciprocating rotary motion as well as said translational motion of each of said arm members is produced by a gear member operatively associated with each said arm member and a drive gear positioned for engagement with said gear member.

13. A machine tool according to claim 12 further including:
 a shaft mounting said drive gear;
 a pinion gear mounted on said shaft; and
 a rack mounted on said frame member for engagement with said pinion gear.

14. A machine tool according to claim 12 wherein each of said arm members is pivotally attached to said gear member by means of a shaft and further includes:
 a bar member attached to each said shaft;
 a pin member extending from said bar member; and
 a slot in said frame member constructed and arranged to receive said pin in a slidable manner so that a four bar linkage motion is effected to said arm members.

15. A machine tool according to claim 14 wherein said gripping means on the outer end of each said arm member for receiving a tool is defined by open ended clamping members with said open ended clamping members being positioned approximately 90° out of phase from each other.

16. A machine tool according to claim 14 wherein said gear member, said pin member and said slot are arranged to effect a parabolic motion to said arm members.

17. A machine tool according to claim 16 wherein said mounting planes are positioned at an angle of approximately 45° with respect to each other.

18. A machine tool according to claim 11 including pivoting means operatively associated with said machine tool frame and said tool changer frame member to pivot said tool changer between the spindle of said machine tool and said tool storage magazine.

19. The method of exchanging tools between a ready station of a tool storage magazine and the work station of a machine tool with a pair of tool securing grips mounted on a pair of movable tool change arms respectively; comprising the steps of engaging one grip with a new tool in the ready station of the tool storage magazine; moving both arms simultaneously for moving their associated grips in separate paths of travel to extract the new tool from the tool ready station while at the same time shifting the empty grip into the tool ready station; moving both arms bodily in unison to the work station with the empty grip moving into engagement with the previously used tool in the work station; moving both arms simultaneously for shifting both grips in their separate continuous arcuate paths of travels for extracting the previously used tool from the work station and moving it away from the work station while at the same time moving the new tool in the other grip toward and into the work station; moving both arms in unison to the tool ready station; moving both arms simultaneously for moving their associated grips in separate continuous arcuate paths of travel for shifting the tool in one grip into the tool ready station and at the same time shifting the other grip away from the tool ready station.

20. The method of claim 19 wherein said arms are moved in both a rotary and a translational movement.

* * * * *

UNITED STATES PATENT AND TRADEMARK OFFICE
CERTIFICATE OF CORRECTION

PATENT NO.  : 4,575,918
DATED       : March 18, 1986
INVENTOR(S) : Clyde E. Mattson It is certified that error appears in the above-identified patent and that said Letters Patent is hereby corrected as shown below:

Claim 1, column 7, line 16, "tool ready storage" should be -- tool storage --.

Claim 1, column 7, line 22, "boby" should be -- body --.

Signed and Sealed this

First Day of July 1986

[SEAL]

Attest:

Attesting Officer

DONALD J. QUIGG

Commissioner of Patents and Trademarks